MEMORY ARRANGEMENT

Filed May 4, 1965

INVENTORS
LESTER M. SPANDORFER
HENRY S. BELSON

BY Rene A. Kuypers

ATTORNEY

United States Patent Office 3,482,223

Patented Dec. 2, 1969

3,482,223

MEMORY ARRANGEMENT

Lester M. Spandorfer, Cheltenham, Pa., and Henry S. Belson, Adelphi, Md., assignors to Sperry Rand Corporation, New York, N.Y., a corporation of Delaware Filed May 4, 1965, Ser. No. 453,114
Int. Cl. G11b 5/62
U.S. Cl. 340—174 5 Claims

ABSTRACT OF THE DISCLOSURE

This invention relates to a plated wire memory device which operates by sensing information through the drive line rather than through the plated wire as is conventionally done. A plurality of bits comprising a memory word or words along the plated wire are biased through the drive line and are read out in parallel by applying a signal to the wire. The respective bits of a word are sensed through individual drive lines.

This invention relates in general to a memory arrangement. In particular, this invention relates to a memory arrangement for parallel read-out of information from a digital memory device.

It is well recognized that in order to achieve rapid cycle times for a memory device operating in the conventional random access or sequential access mode, parallel read-out of certain address locations is a necessity.

It is also desirable to address the memory of a digital computer by content rather than location. When a memory device operates in this manner it is called a content address memory. In a content address memory, every filled location can be addressed by any or all of its contents. Once certain information has been located in a content addressed memory, the information must be read-out as rapidly as possible in order to provide rapid cycle times. It is therefore desirable to utilize a parallel read-out technique for a content addressed memory since this latter technique provides the most rapid read-out expedient.

It is therefore an object of this invention to provide a new and improved memory arrangement.

It is also an object of this invention to provide a new and improved memory read-out arrangement.

It is a further object of this invention to provide a memory device having a new and improved parallel read-out organization.

It is another object of this invention to provide a random or sequential access memory device having a new and improved parallel read-out organization.

It is yet another object of this invention to provide a content address memory device having a new and improved parallel read-out organization.

In accordance with this invention, a plurality of magnetizable plated wires are arranged parallel to one another. Positioned substantially orthogonal and in juxtaposition thereto are a plurality of conductive lines. The magnetizable plated wires are connected to a current pulse generator, whereas the conductive wires are connected to both a bias current source as well as to a sensing device. The intersection of a plated wire and a conductive line comprises a memory bit position which is adapted to store a binary zero or one. A plurality of memory words comprised of the above mentioned bits are arranged along the plated wire and in this respect, the arrangement is unlike that of a conventionally arranged random access plated wire memory device, wherein the memory words are located along the conductive wire. In other words, the memory word arrangement of the subject invention is 90° out of phase with conventionally arranged random access, plated wire memories.

The first step in the read-out process is the application of a bias current to the conductive lines. This bias current causes the magnetization vectors located at each bit position to be rotated to a small angle removed from the easy axis of magnetization, wherein the easy axis is located around the circumference of the plated wire. The second step in reading out information from the memory is to apply a read-out current to the plated wire. Upon the application of this read-out current, the magnetization vectors at the various bit positions are rotated in one of two classes, depending on whether a binary one or zero had been stored at each bit position. For the vectors in the "one" direction, the rotation is directly back to the easy axis (i.e., the direction in which they are positioned before application of the bias current), whereas the vectors which are in the "zero" direction are rotated toward the 90° position (i.e., the hard axis of magnetization). The respective rotations of the magnetization vectors above described induces a different polarity voltage in the conductive drive line, thus allowing a stored binary one to be distinguished from a binary zero. In this particular mode of operation, the read-out does not destroy the stored information and is termed non-destructive. Furthermore, since an entire word is located along the plated wire, when the read-out pulse is applied thereto, the entire word is read out of the memory at one time (i.e., in parallel) since each of the induced signals received by the conductive lines can be detected at one time.

The invention may also operate in the destructive mode. In this type of operation, the application of the bias current applied to the plated wire as before causes the magnetization vectors to be rotated back to the easy axis whenever a binary one is stored. Whenever binary zeroes are stored, the magnetization vectors rotate through the 90° position. In the event that there is a rotation through the 90° position, a relatively large voltage is induced in the conductive lines. This larger signal is detected by examining the conductive line at a period of time which occurs after the magnetization vectors have passed the 90° position by the sense device connected to the conductive line. Hence, the content (i.e., a binary "1" or "0") of the bit position can be determined since in one case there will be a large amplitude signal detected during read-out and in another case there will not be a signal detected (i.e., the signal induced by rotating back to the easy axis will have died out).

The novel features that are considered characteristic of this invention are set forth with particularity in the appended claims. The invention itself, however, both as to its organization and method of operation, as well as additional objects and advantages thereof, will best be understood from the following description when considered in conjunction with the accompanying drawings, wherein:

Figure 1:
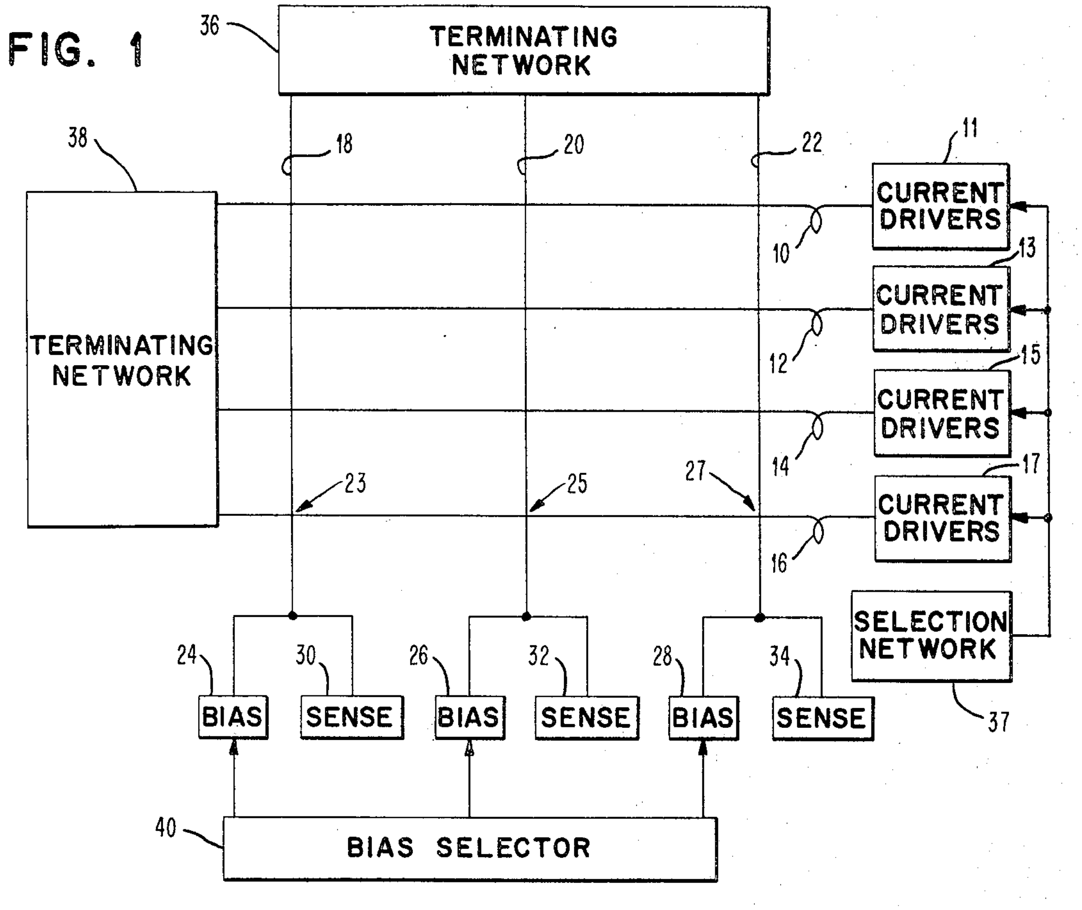
FIGURE 1 depicts the general organization of a memory having a parallel read-out capability.

Referring now to the drawings, and particularly to FIGURE 1, there is depicted a general arrangement of the memory device provided by the instant invention. It should be understood that the principles hereinafter discussed are readily applicable to any digital memory requiring parallel read-out. Accordingly, four plated wires 10, 12, 14 and 16 are shown horizontally oriented. The plated wires 10, 12, 14 and 16 are typically 5 mil diameter beryllium copper substrates upon whose surface is formed a thin, magnetic film. The magnetic film is electroplated on the wire surface with approximately a 10,000 Angstrom thickness of Permalloy (80% nickel–20% iron). The Permalloy coating is electroplated in the presence of a circumferential magnetic field that establishes a uniaxial anisotropy at right angles (i.e., around the circumference) to the length of the wire. The uniaxial anisotropy establishes an easy and hard direction of magnetization and the magnetization vectors of the thin film are normally oriented in a first or second equilibrium position along the easy axis, thereby establishing two bistable states necessary for binary logic applications.

Each of the plated wires 10, 12, 14 and 16 are connected to respective current driver 11, 13, 15 and 17, respectively. The current drivers are current sources required for the operation of the memory device as will be discussed hereinafter. The current drivers are further connected to a selection circuit 37. Also connected to the other end of the plated wires is a terminating network 38. The terminating network 38 comprises a ground bus thereby establishing a complete circuit with the drivers 11, 13, 15 and 17, which are also grounded.

The conductive lines 18, 20 and 22 are shown arranged substantially orthogonal and in juxtaposition to the plated wires 10, 12, 14 and 16. In a typical embodiment the conductive wires 18, 20 and 22 may be approximately 10 mils wide. The terminating network 36 connected to the conductive lines may be a ground bus or may also be an impedance matched to the impedance of the line. This will be discussed in greater detail hereinafter. Bias circuits 24, 26 and 28 as well as sense amplifiers 30, 32 and 34 are connected at the other end of the conductive lines 18, 20 and 22.

It should be noted that the intersection of a conductive line and a plated wire comprises a memory bit position. At, for example, the bit position 23 (i.e., the intersection of the conductive line 18 and the plated wire 16) there is stored binary information. This information may be either a binary 0 or binary 1 depending upon the particular orientation of the magnetization vectors along the easy axis. A three bit word comprising the bits 23, 25 and 27 are located along the plated wire 16. It should be understood that a plurality of words can be located along the wire 16.

In the event that the subject invention is to be utilized for a content addressed application, a coded arrangement for the drive lines as described and disclosed in a copending patent application of George A. Fedde and Lester M. Spandorfer, Ser. No. 334,114, now Patent No. 3,311,901, can be used to great advantage.

Figure 2:
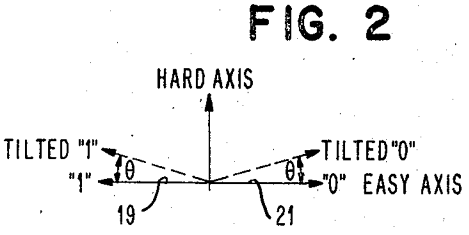
FIGURE 2 shows the orientation of the magnetization vectors at a particular bit position after a bias signal has been applied.

In operation, a bias current is applied to the respective conductive lines 18, 20 and 22 by the respective bias circuits 24, 26 and 28. The bias currents, in one embodiment, may be simply a pulse of current which is in the same direction in each of the conductive lines. This small current pulse has the effect of rotating or tilting the magnetization vectors at each bit position to some small angle removed from the easy axis magnetization. This particular rotation may be more readily appreciated by referring to FIGURE 2. FIGURE 2 depicts a single magnetization vector for either a binary "0" (i.e., vector 21) or a "1" (i.e., vector 19) removed from the easy axis by some small angle $\theta$ or $\theta'$. It should be noted that the easy axis is in reality oriented around the circumference of a plated wire. Hereinafter, for the sake of convenience these magnetization vectors will be referred to as tilted 1's or tilted 0's.

Assume that it is now required to read-out in parallel the three bit word comprising the information stored in the bit positions 23, 25 and 27. In an associative memory arrangement, the word represented by the bits would be designated as a tagged word after the search made has been completed. The selection network 37 functions to selectively energize the required current driver. In a random or sequential access arrangement, the selection network 37 selects the required address. With the magnetization vectors tilted in the manner shown in FIGURE 2, pulse of current is applied by the current driver 17 before the bias pulse has been terminated. The current supplied by the driver 17 generates a magnetizing field in a direction determined by Ampere's Law.

Let us assume, for the sake of discussion, that the magnetizing force generated by current from the driver 17 is in a leftward direction but parallel to the easy axis in FIGURE 2. The magnetizing force generated by this current will cause the tilted "1" to be rotated back into the easy axis direction, whereas the tilted "0" will be rotated through the hard axis if the force is of sufficient magnitude or may be rotated to an angle just slightly less than the 90° position. If the tilted "0" rotates past the hard axis, there is destructive read-out of that particular bit of information, but on the other hand if the tilted "0" is rotated to an angle slightly less than the hard axis there will be non-destructive read-out of the information.

Figure 3:
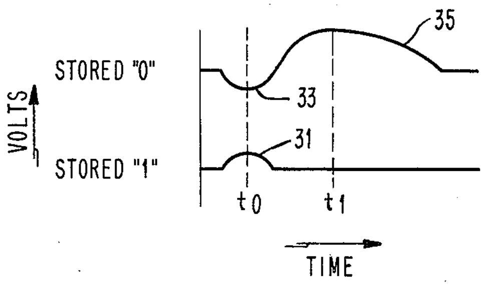
FIGURE 3 depicts the output signals produced by a readout of a bit position of the memory device shown in FIGURE 1.

Since the tilted "1" is rotated back to the easy axis of magnetization there is only a small amplitude voltage (31, FIG. 3) induced in the conductive line 18 for a read-out of a binary "1." Alternately, the tilted "0" will be rotated in the destructive read-out mode past the hard axis and thence to a new rest position along the easy axis. Therefore, the induced signal in the conductive line will have a polarity opposite to that of a stored 1 (33, FIG. 3) but will be of high amplitude because the rotation from the 90° position to the newly oriented position along the easy axis (35, FIG. 3). Therefore, the memory arrangement of FIGURE 1 will determine whether a binary "1" or "0" is stored at a certain bit position by having the respective sense amplifiers 30, 32 and 34 strobe at the time period $t_1$ (FIG. 3) corresponding to the high amplitude positive portion of the read-out signal. In the event that the memory arrangement of FIGURE 1 is to operate in the nondesrtuctive mode, the sense amplifiers may strobe at the time period $t_0$. From the above discussion it is apparent that as soon as the read-out pulse is applied from a current driver (17 in the above example) there is an immediate parallel read-out of bits 23, 25 and 27 comprising the memory word located along the plated wire.

It should be noted that when a read-out signal is induced in the conductive lines 23, 25, and 27, the inverse polarity of that signal, in accorrdance with transmission line theory, travels to the terminating network 36 whereas the correct polarity travels toward the sense amplifier. If the network 36 comprises a matched impedance to that of the lines 18, 20 and 22, the inverse polarity signal will be absorbed therein. If the network 36 is at ground potential, the inverse signal will be reflected back to the sense amplifier with the same polarity as the correct polarity pulse. Provided that the line is relatively short, the two signals above described will be substantially superimposed.

In the event that the instant invention is to operate in the destructive read-out mode, the information that is destroyed is re-recorded. This is accomplished by applying a write pulse to the required drive lines 23, 25, and 27 by means of a driver circuit (not shown) and simultaneously applying a steering current to the required plate wire by means of a bit driver (not shown). This technique is readily available to those skilled in the plated wire memory art.

The parallel read-out arrangement of FIGURE 1 has been described above in terms of a bias current pulse and a read-out current pulse wherein the latter is applied before the former is terminated. The invention may be easily modified so that the bias circuits 24, 26, and 28 provide a constant D.C. current. In all other respects the invention operates in the manner above described. The induced read-out signals 31, 33 and 35 shown in FIGURE 3, however, are superimposed upon the D.C. bias level. However, these signals may readily be recovered by using D.C. isolation techniques such as transformer coupling.

Although this invention has been described as a parallel read-out device, it is within the spirit of this invention to read out such information in bit serial should the need arise. To accomplish this ,a bias selector 40 is connected to the bias circuits 24, 26 and 28. With this circuit arrangement, each bit can be inspected individually by selectively energizing any one of the bias circuits after which a read-out pulse from the current driver is applied to the required plated wire. The selected bit is then read from the associated sense amplifier.

In summary therefore, this invention relates to a plated wire memory arrangement which is adapted to read-out information in parallel. The memory is arranged so that the memory words are located along the wire. The invention comprises biasing a bit position by partially rotating the magnetization vectors thereat. A read-out pulse is applied to the plated wire so as to again rotate the magnetization vectors and therefore induce a read-out signal in a conductive wire which is placed orthogonally to the plated wire. The polarity of the signal induced in the conductive wires and detected by appropriate sense amplifiers indicate whether a binary "1" or binary "0" is stored therein. Since an entire word can be placed along the plated wire, it is possible in accordance with this invention to read-out an entire word in parallel immediately upon the application of an energizing signal to the plated wire. The invention can also be utilized to read bit serial.

Obviously, many modifications and verifications to the present invention are possible in light of the above teaching. It is therefore to be understood that within the scope of the appended claims, that the invention may be practiced otherwise and as specifically described.

The embodiments of the invention in which an exclusive property or privilege is claimed are defined as follows:

1. A memory arrangement comprising:

(a) a magnetizable wire adapted to store an information signal said wire having an easy axis which is circumferential, the magnetization of said film being oriented quiescently around said easy axis;

(b) conductive means positioned in juxtaposition to said magnetizable wire and parallel to the direction of said easy axis;

(c) means connected to said conductive means to couple a first magnetic field to said magnetizable wire, said magnetic field biasing said magnetizable wire by rotating said magnetization to an angle away from said easy axis;

(d) sense means connected to said conductive means;

(e) means connected to said magnetizable wire to generate a second magnetic field to read-out said information signal by further rotating said magnetization, said second magnetic field being generated after said first magnetic field has been applied, said information signal being thereby induced in said conductive means which is detected by said sense means.

2. A memory device comprising:

(a) a plurality of magnetizable wires, each said wire adapted to store a plurality of binary information signals, said wires having an easy axis which is circumferential and a magnetization which is quiescently oriented around said easy axis;

(b) a plurality of conductive means positioned in juxtaposition to said plurality of magnetizable wires and perpendicular thereto as well as parallel to said easy axis, a single binary information signal being stored at the intersection of said magnetizable wires and said conductive means;

(c) means connected to each said conductive means to apply a first current pulse thereto, said first current pulse producing a magnetic field which is in a direction to bias said magnetizable wire at each said intersection by rotating said magnetization through a small angle;

(d) sense means connected to each said conductive means;

(e) current means connected to each said magnetizable wire, said current means adapted to apply a read current to said respective magnetizable wire;

(f) means connected to said current means to select one of said current means to read-out in parallel the information stored along one of said magnetizable wires by further rotating said magnetization.

3. A memory arrangement comprising:

(a) a plated magnetizable wire adapted to store a plurality of information signals along its length, said plated wire having the property of uniaxial anisotropy with an EASY axis which is circumferential and a HARD axis which is 90 degrees therefrom, the magnetization of said wire being normally oriented along said EASY axis;

(b) a plurality of conductive means disposed in juxtaposition to said magnetic wire along its length;

said conductive means being oriented parallel to said EASY axis;

the intersection of said wire and one of said conductive means comprising a location whereat binary information is stored;

a plurality of such bits forming a memory word along said wire;

(c) detector means connected to conductive means;

(d) bias means further connected to said conductive means to rotate said magnetization of said respective memory elements through a small angle;

(e) means for simultaneously reading out said bits along said wire by applying a signal to said wire by further rotating said magnetization.

4. The memory arrangement in accordance with claim 3 wherein said means for simultaneously reading out said bits is accomplished non-destructively by rotating the magnetization vectors to an angle less than ninety degrees.

5. The memory arrangement in accordance with claim 3 wherein said means for simultaneously reading out said bits is accomplished destructively by rotating the magnetization vectors to an angle greater than ninety degrees.

References Cited

UNITED STATES PATENTS

| | | | |
|---|---|---|---|
| 3,293,620 | 12/1966 | Renard | 340—174 |
| 3,295,115 | 12/1966 | Snyder | 340—174 |
| 3,069,665 | 12/1962 | Bobeck | 340—174 |
| 3,105,226 | 9/1963 | Bobeck | 340—174 |
| 3,133,271 | 5/1964 | Clemons | 340—174 |
| 3,218,616 | 11/1965 | Huijer et al. | 340—174 |

STANLEY M. URYNOWICZ, Jr., Primary Examiner